US009418377B2

(12) United States Patent
Kardell

(10) Patent No.: US 9,418,377 B2
(45) Date of Patent: Aug. 16, 2016

(54) SYSTEM AND METHOD FOR VISUALIZING PROPERTY BASED LISTING ON A MOBILE DEVICE

(71) Applicant: Aaron Kardell, St. Paul, MN (US)

(72) Inventor: Aaron Kardell, St. Paul, MN (US)

(73) Assignee: MobileRealty Apps.com, LLC, Minneapolis, MN (US)

( * ) Notice: Subject to any disclaimer, the term of this patent is extended or adjusted under 35 U.S.C. 154(b) by 528 days.

(21) Appl. No.: 13/826,366

(22) Filed: Mar. 14, 2013

(65) Prior Publication Data

US 2014/0129387 A1 May 8, 2014

Related U.S. Application Data

(60) Provisional application No. 61/721,807, filed on Nov. 2, 2012.

(51) Int. Cl.
| G06Q 30/00 | (2012.01) |
| G06Q 50/00 | (2012.01) |
| G06Q 30/06 | (2012.01) |
| G06Q 50/16 | (2012.01) |
| G06F 17/30 | (2006.01) |

(52) U.S. Cl.
CPC ........ *G06Q 30/0623* (2013.01); *G06Q 30/0641* (2013.01); *G06Q 50/16* (2013.01); *G06F 17/3087* (2013.01)

(58) Field of Classification Search
CPC .......... G06Q 30/0623; G06Q 30/0641; G06Q 50/16; G06F 17/3087
USPC ........................ 705/26.61, 27.1, 313; 707/946
See application file for complete search history.

(56) References Cited

U.S. PATENT DOCUMENTS

| 7,983,611 | B2* | 7/2011 | Rao ............................. 455/3.04 |
| 8,051,089 | B2* | 11/2011 | Gargi et al. .................... 707/758 |
| 8,346,796 | B2* | 1/2013 | Kardell ......................... 707/769 |
| 8,510,031 | B2* | 8/2013 | Williams et al. .............. 701/400 |

(Continued)

OTHER PUBLICATIONS

Veiga, A., "Mobile Application for Real Estate Go Beyond Search," The Associated Press, published Jan. 15, 2010, 5 page, accessed online at ,http://seattletimes.com/html/realestate/2010786752_realmobileapps17.html. On Sep. 20, 2012.*

Anon., Smarter Agent, "Mobile Real Estate Search Experts," 1 page, accessed online at ,http://www.smarteragent.com/> on Apr. 12, 2012.*

(Continued)

*Primary Examiner* — Nicholas D Rosen
(74) *Attorney, Agent, or Firm* — Schwegman Lundberg & Woessner, P.A.

(57) ABSTRACT

A system and method for visualizing property based listing on a mobile device may include grouping a plurality of property listings into at least one property listing group, the plurality of property listings selected based on a search area associated with a location of a mobile device; displaying, on the mobile device, a first group of the at least one property listing group overlaid on a live view of a camera of the mobile device, the displayed location of the first group based on an orientation of the mobile device; displaying a details interface overlaid on the live view, the details interface including attribute data of a first property listing of the first group; receiving a user interaction with the details interface; and displaying attribute data from a second property listing of the first group based on the user interaction.

21 Claims, 11 Drawing Sheets

(56) References Cited

U.S. PATENT DOCUMENTS

| | | | |
|---|---|---|---|
| 9,009,610 B2* | 4/2015 | Florance et al. | 715/762 |
| 2004/0220906 A1* | 11/2004 | Gargi et al. | 707/3 |
| 2005/0091218 A1* | 4/2005 | Janes et al. | 707/10 |
| 2006/0089792 A1* | 4/2006 | Manber et al. | 701/207 |
| 2008/0103787 A1* | 5/2008 | Cavanaugh et al. | 705/1 |
| 2008/0119133 A1* | 5/2008 | Rao | 455/3.05 |
| 2011/0125393 A1* | 5/2011 | Williams et al. | 701/200 |
| 2011/0301987 A1* | 12/2011 | Wiese | 705/7.11 |
| 2012/0231814 A1* | 9/2012 | Calman et al. | 455/456.3 |
| 2013/0332877 A1* | 12/2013 | Florance et al. | 715/781 |

OTHER PUBLICATIONS

Anon., REALTOR.com, "Mobile Real Estate Apps for Home Search," 1995-2012, 2 pages, accessed online ,http://www.realtor.com/mobile> on Apr. 12, 2012.*

Anon., DreamTown.com, "The Best Chicago Real Estate Search Engine," 2 page, accessed online <http://www.dreamtown.com/mobile-search.jsp> on Sep. 20, 2012.*

Anon., "Bank of America; Researchers Submit Patent Application, 'Real-Time Analysis Involving Real Estate Listings', for Approval," Computer Weekly News, Oct. 4, 2012.*

* cited by examiner

SYSTEM AND METHOD FOR VISUALIZING PROPERTY BASED LISTING ON A MOBILE DEVICE

CROSS-RELATED PATENT DOCUMENTS

This patent application claims the benefit of priority, under 35 U.S.C. §119(e), to U.S. Provisional Patent Application Ser. No. 61/721,807, titled "SYSTEM AND METHOD FOR VISUALIZING PROPERTY BASED LISTING ON A MOBILE DEVICE," filed on Nov. 2, 2012, which is incorporated by reference in its entirety.

This patent application relates to U.S. application Ser. No. 13/091,232, to Aaron Kardell, titled "SYSTEM FOR SEARCHING PROPERTY LISTINGS BASED ON LOCATION," filed on Apr. 21, 2010, which is incorporated by reference in its entirety.

BACKGROUND

Multiple Listing Service (MLS) publish listings of retail properties that are currently for sale. Each local market may have a separate MLS database that may be queried.

Smart phones and tablets are increasingly location aware. Additionally, they are able to run applications developed independently of the smart phone or tablet manufacturer. These applications may use the location aware features of the phone to enhance its capabilities.

BRIEF DESCRIPTION OF THE DRAWINGS

Some embodiments are illustrated by way of example and not limitation in the figures of the accompanying drawings in which.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are illustrated in enough detail to enable those skilled in the art to practice the invention. The embodiments may be combined, other embodiments may be utilized, or structural, logical, and electrical changes may be made without departing from the scope of the present invention. The following detailed description is, therefore, not to be taken in a limiting sense, and the scope of the present invention is defined by the appended claims and their equivalents. In this document, the terms "a" or "an" are used, as is common in patent documents, to include one or more than one. In this document, the term "or" is used to refer to a nonexclusive or, unless otherwise indicated.

The enhanced functionality of smart phones has enabled application developers to provide services that were not previously available to consumers. For example, many phones include Global Positioning System (GPS) information which applications use to provide location centric functions. One example of using GPS data is in the context of a real estate search. A user may be running a real estate searching application which uses GPS data to display homes for sale in the vicinity of the user. In an example embodiment, listings of homes with location information are already stored on the phone. This may obviate the need to query an external network with the GPS data before any results may be returned. By storing listings of homes with location information, an increase in the speed in which results are shown may be obtained, and wireless bandwidth usage may be reduced. In addition, increased privacy may be provided to users by not transmitting their location to remote servers. In other examples, the listing information is not pre-stored on the computing device, but instead is requested as needed from a server based on application usage (e.g., new GPS coordinates, user selected location, user selected listing). The retrieved listing information returned in response may then be processed and displayed to a user as described in the various examples described herein.

Figure 1:
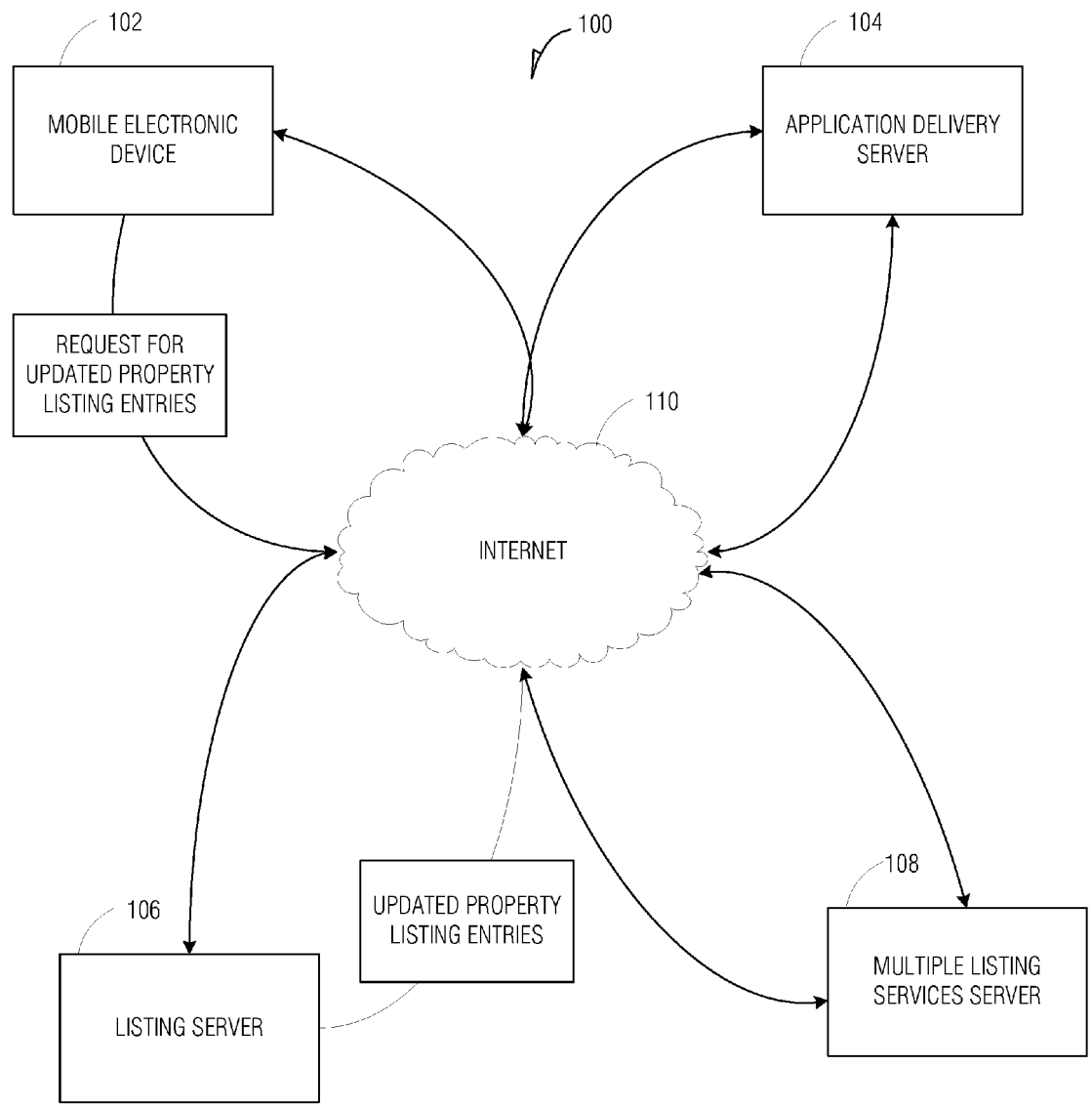
FIG. 1 is an example system of a mobile device requesting property listings, according to an example embodiment.

FIG. 1 is an example system 100 of a mobile device requesting updated property listings, according to an example embodiment. Shown are mobile electronic device (MED) 102, Application Delivery Server 104, Listing Server 106, and MLS server 108. In an embodiment, a property searching application is stored on the mobile electronic device. The property searching application may be downloaded from the Application Delivery Server through network 110 (e.g., the Internet).

A user of MED 102 launches the property searching application on the MED to begin a search of property listings. In an embodiment, when the user downloads the property searching application, the download includes a set of property listing entries. Each property listing entry may include an identification data field and a location coordinate data field (e.g., longitude and latitude). Upon launching the application, the property searching application may send a request to Listing Server 106 for updated property listing entries. The updated property listing entries may include instructions to add, modify, or delete existing property listing entries on the MED.

In various embodiments, upon launching the property searching application, a search area to use with the property searching application is determined. For example, the search area may be determined according to a GPS reading of the mobile electronic device. In an embodiment, the search area is determined according to the bounds of a map displayed on the user's screen. For example, the user may navigate to a location that is different than his or her physical location. The search area may be considered the center of the map displayed on the mobile electronic device's screen. In an embodiment, the search area is updated when the boundaries of the displayed map change (e.g., user input such as scrolling or zooming the map or the GPS coordinates change). In an embodiment, the search area is initially set when a user enters in a city name, postal code, or address.

In an embodiment, properties located within a search area may be represented as indicia (e.g., icons, shapes, symbols, text, etc) and displayed on the map. For example, the search area may be the area within the bounds of the map displayed on the user's screen. In an embodiment, coordinates within the search area are compared with the location coordinates or addresses of the property listing entries, and matching properties within the search area are represented as indicia on the map. A user may select one of the representations (e.g., the indicia) to retrieve detailed attributes about the selected property. The search area may be updated as discussed above. In various embodiments, the search area is defined by a distance away from a specified location (e.g., locations within ten miles of the location of the mobile electronic device).

In various embodiments, attribute information of a property (also referred to as property attributes) may be stored in more than one level of detail. For example, attribute information may be stored as a range (e.g., $250,00 to $300,000 if the attribute is the price of a home) or as a single value ($279, 230). In an embodiment, when the attribute information is stored as a range of values the attribute information may be considered partial attribute information. When the attribute information is stored as a single value it may be considered detailed attribute information.

In various embodiments, a combination of partial and detailed attribute information may be stored in a database on the MED (in a flat file or relational database). The attribute information may be associated with a property listing entry. In an embodiment, the MED initially has partial attribute information, but no detailed attribute information. In an embodiment, the partial attribute information is kept up-to-date.

As needed detailed attribute information may be retrieved from the listing server by sending the identification of a property to Listing Server 106. For example, detailed attributed information may be received for a selected representation of a property to Listing Server 106. In various embodiments, the database is updated with the detailed attribute information. In an embodiment, the detailed attribute information replaces the partial attribute information when it is received from Listing Server 106. In an embodiment, the partial attribute information is stored alongside the detailed attribute information.

In an embodiment, detailed attribute information is pre-fetched (e.g., requested from the listing server) and stored in the database before a user selects one of the representations. The amount of detailed attribute information pre-fetched may be determined according to some of the user's search criteria as well as what is already stored in the database. For example, consider a user searching for homes that are below $250,000, but the database has partial attribute information indicating a range of $200,000 to $300,000. The MED may send a request for detailed attribute information on all homes within this range to determine whether or not a home falls within the user's price criteria. However, the MED may not need to send a request for detailed attribute information for homes that have partial attribute information indicating a range of $150, 000 to $200,000. In an embodiment, detailed attribute information is retrieved for all properties located within the search area.

Attribute information may include price information, address information, number of bedrooms, number of bathrooms, status (e.g. active, sold, foreclosed, etc.), type (e.g. single family, condo, etc.), square footage, year built, and whether or not the property is a featured property. In various embodiments, attribute information includes photo files of the property listing. In various embodiments, attribute information includes open house information. In various embodiments, attribute information includes the MLS listing number. The attributes may have varying levels of detail. For example, partial open house information may be stored as yes/no, whereas detailed open house information may be stored as the time and date of the open house. Partial address information may include a zip-code where as detailed address information includes the entire address. In various embodiments, the partial and detailed attribute information are the same (e.g., whether or not a property is a featured property).

In various embodiments, mobile electronic device 102 includes a processor, display, network interface, memory, one or more applications stored on the memory, location determination hardware, and an input interface. Mobile electronic device 102, may be, but is not limited to a phone, tablet, or laptop. The display may be non-touch, a capacitive touchscreen, or a resistive touchscreen. In the case of using a touchscreen, the display can also be used as an input interface. Other input interfaces may include a keyboard, a stylus, gesture control, or voice control. Network interfaces include interfaces capable of receiving and sending data such as wireless interfaces CDMA, GSM, WI-FI, WiMAX, or wired interface such as Ethernet or USB. The location determination hardware may include, but is not limited to, GPS, Assisted GPS, cell tower based location determination, Wi-Fi access points, or RFID based location determinations. The processor executes instructions stored on the memory to provide the functionality described herein. In various embodiments, mobile electronic device 102 is a smart phone.

In various embodiments, Application Delivery Server 104, Listing Server 106, and MLS Server 108 include a processor, display, network interface, memory, one or more applications stored on the memory, and an input interface. Input interfaces may include touchscreens, a keyboard, a stylus, gesture control, or voice control. Network interfaces include interfaces capable of receiving and sending data such as wireless interfaces CDMA, GSM, WI-FI, WiMAX, or wired interface such as Ethernet or USB. The processor executed instructions stored on the memory to provide the functionality described herein. In various embodiments, Application Delivery Server 104, Listing Server 106, and MLS Server 108 are personal computers. In various embodiments, Application Delivery Server 104, Listing Server 106, and MLS Server 108 are configured as servers without displays such that the servers are controlled remotely via protocols such as HTTP or SSH.

In various embodiments, MLS Server 108 stores a set of property listing entries in a database. MLS Server 108 may store localized versions of a set of property listing entries. For example, MLS Server 108 may store property listing entries associated with residential homes for sale in the Minneapolis, Minn. market. Each listing entry may include one or more data fields that store attribute information about a residential property listing. For example, attribute information may include, but is not limited to, an identification number, an address, longitude and latitude coordinates, number of bedrooms, number of bathrooms, square footage, date added to the MLS listings, and sales price. In various embodiments, the entries are stored using a database management system (DBMS), a flat file database, or XML.

In various embodiments, Listing Server 106 communicates with MLS Server 108 to store the set of property listing entries. Listing Server 106 may also store partial and detailed attribute information for the property listings. In addition to the set of property listing entries, Listing Server 106 may also maintain data associated with application identities of downloads of the property searching application. In various embodiments, the application identity may be a serial number, a version number, or a timestamp that indicates the time of a download of the property searching application or the last time property listings were updated. Thus, in various embodiments, the property searching application may be identified through the use of timestamp or version number of the property searching application stored on the mobile electronic device. In various embodiments using a timestamp or version number there is no need to have an application uniquely identified.

In various embodiments, Listing Server 106 may maintain an application identifier for each download of the property searching application. When a request from a mobile electronic device is received, Listing Server 106 is able to retrieve data associated with that specific download of the property searching application. The data associated with a download may include the location of the download (e.g., Minneapolis) and the last time a request was made for property listing entries for that specific property searching application.

In various embodiments, Application Delivery Server 104 is responsible for responding to a request for downloads of applications which are transmitted to mobile electronic devices. In an embodiment, Application Deliver Server 104 is configured to host many types of applications (e.g., games, reference, and searching applications). In an embodiment, Application Delivery Server 104 is configured to be responsible only for property searching applications. For example, Application Delivery Server 104 may store different sets of property listing entries for the various location based versions of a property searching application. In an embodiment, Application Delivery Server 104 may store multiple branded versions of property listing entries (e.g., multiple local brokers might each have different sets of property listing entries). In an embodiment, if a user requests the Minneapolis version of the property searching application, an initial set of Minneapolis based property listings may be transmitted with the property searching application. Furthermore, Application Delivery Server 104 may transmit a notification to Listing Server 106 with an identification of the application with the time the property searching application was downloaded. In an embodiment, Application Delivery Server 104 may transmit a notification to Listing Server 106 with an identification of the version or timestamp of the property searching application downloaded. In an embodiment, the download of the application is delivered to mobile electronic devices with a version or timestamp identifying the version of the listing database, which obviates the need for the Application Delivery Server 104 to transmit a notification to Listing Server 106.

While Application Delivery Server 104, Listing Server 106, and MLS Server 108 are illustrated as distinct servers, in other embodiments these servers may be combined on one physical machine or the functionality may be distributed across multiple physical machines beyond those illustrated. For example, the functionality described for Listing Server 106 and Application Delivery Server 104 may be housed in one machine.

Figure 2A:
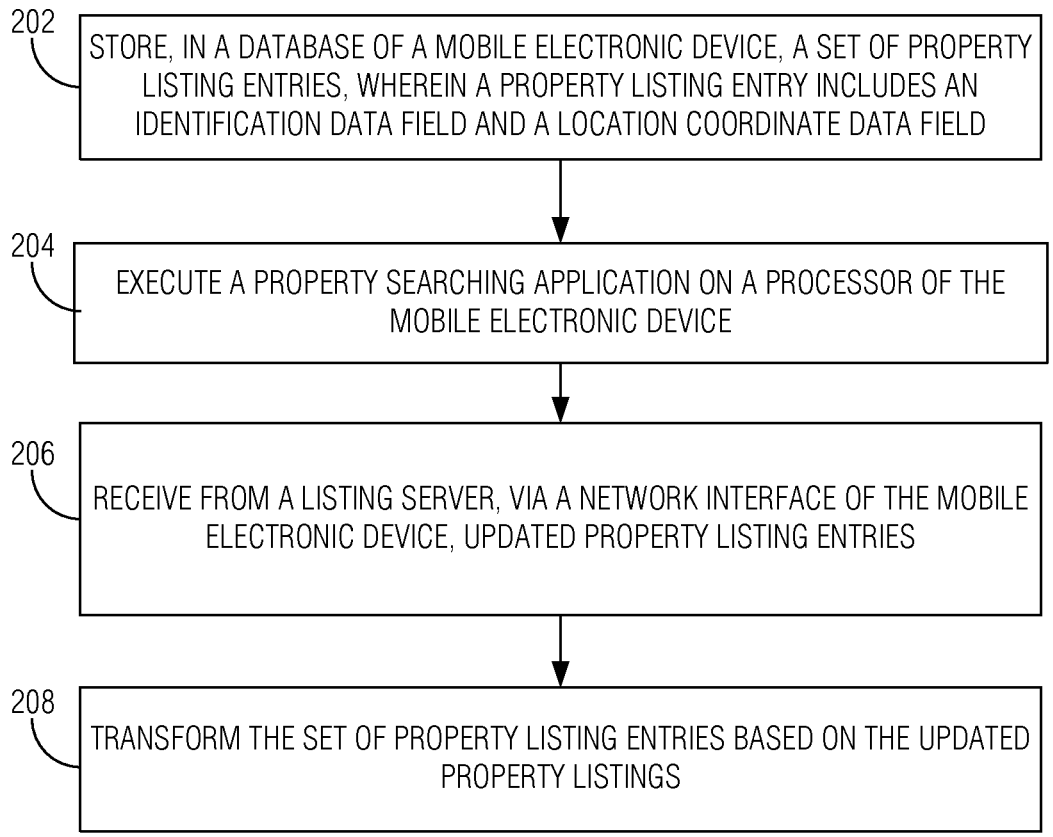
FIG. 2A is an example method of receiving updated property listings, according to an example embodiment.

FIG. 2A is an example method of receiving updated property listings, according to an example embodiment. In an embodiment, at block 202, a set of property listing entries are stored in a database of a mobile electronic device (MED), wherein a property listing entry includes an identification data field and a location coordinate data field. Additionally, detailed property attributes may be stored in one or more data fields of a property listing entry, wherein the detailed property attributes include square footage, address, and a number of bedrooms. Partial property attributes may include compressed (e.g., ranges) versions of detailed property attributes. For example, partial property attributes may include a price range. Varying amounts of detail may be stored for each property listing entry. For example, a MED may initially store attributes that are commonly searched by users (whether partial or detailed—e.g., a listing price range of $150,000-$225,000 or a listing price of $194,900). If additional or more detailed attribute information is requested for a specific property, a request may be made to a listing server to retrieve the additional or detailed attribute information. This may be accomplished, for example, by transmitting information stored in the identification data field of the one or more property listing entries to the listing server. In some embodiments, information related to a listing agent may be stored in the property listing entry.

In an example embodiment, at block 204, a property searching application is executed on a processor of the mobile electronic device. The application may be received as described with respect to FIG. 1. In various embodiments, a property searching application is branded such that contact information is included in the download of the property searching application. Thus, the user may be directed towards a specific agency or person for scheduling a showing for a specific property.

In an example embodiment, at block 206, updated property listing entries are received, via a network interface of the mobile electronic device, from a listing server. At block 208, the set of property listing entries is transformed based on the updated property listings. Updated listing, in an embodiment, may include changes to existing property listing entries, additional property listing entries, and instructions to remove existing property listing entries. The request for updated property listing entries may be initiated in a number of ways including, application launch, user request, periodic (e.g., daily), or when a certain type of network interface is detected (e.g., WI-FI or USB). In an embodiment, the updated property listing entry may include updated partial or detailed attribute information associated with a property listing entry.

Figure 2B:
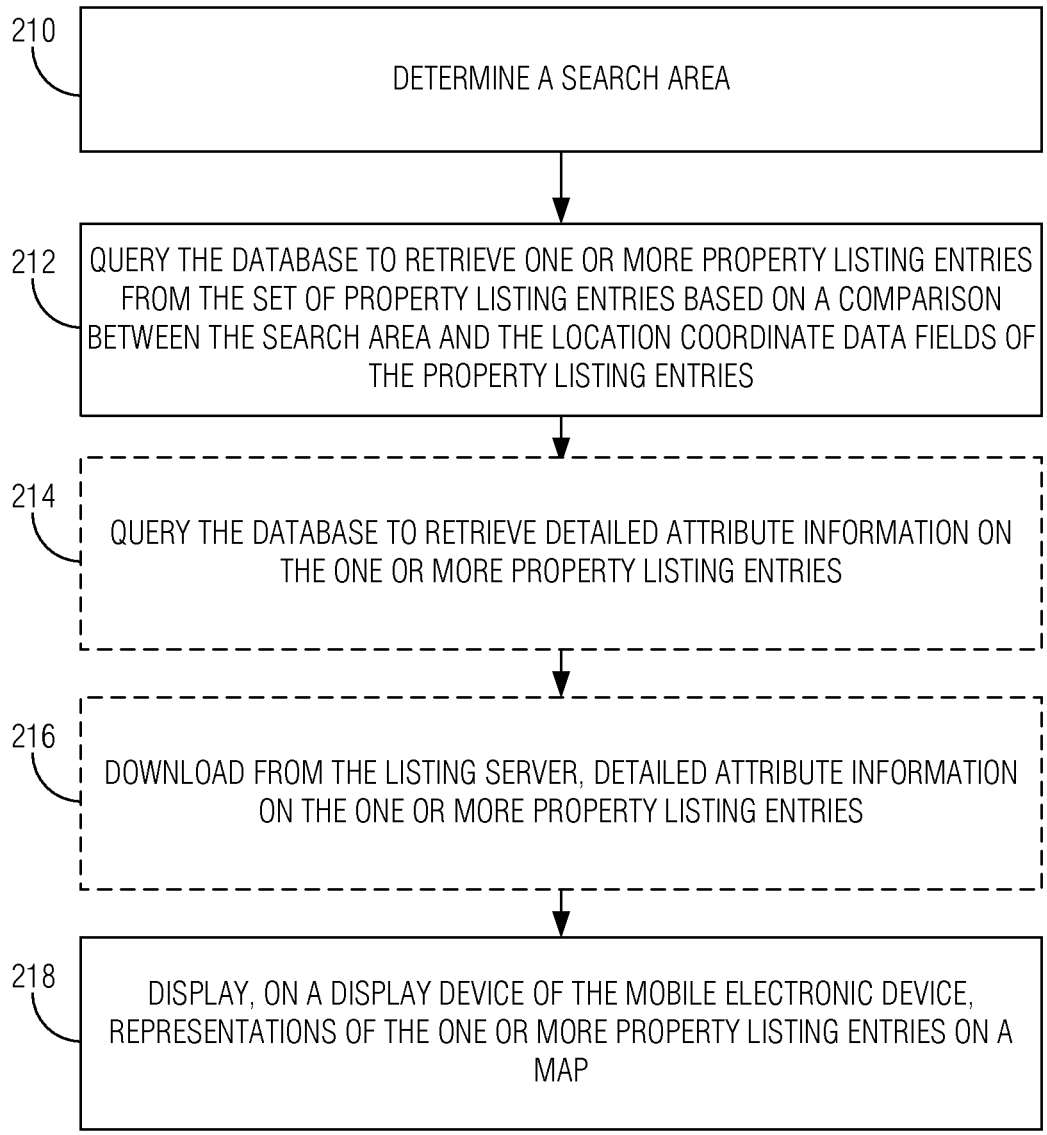
FIG. 2B is an example method of querying a database, according to an example embodiment.

FIG. 2B is an example method of querying a database to retrieve property listings. In an example embodiment, at block 210, a search area is determined. For example, the search area may be determined according to the location of the mobile electronic device. In an embodiment, the search area is determined according to the bounds of a map displayed on the mobile electronic device. In an embodiment, a user may input a search location to use as the basis for the search area and the search may not be dependent on the location of the mobile electronic device.

At block 212, the database is queried to retrieve one or more property listing entries from the set of property listing entries based on a comparison between the search area and the location coordinate data fields of the property listing entries. In an embodiment, querying a database includes accessing a database with criteria to retrieve property entries matching the criteria. For example, if the database is a relational database, an SQL statement may be generated using the search area as an input criteria. If the database is a flat file, the flat file may be traversed to look for entries that have location coordinates within the search area. In an embodiment, user search preferences of property attributes may be received and the one or more property listing entries may be filtered according to the user preferences. For example, a user search preference may indicate a price range or square footage range. Property listing entries outside of the user preferences may be filtered out of the matched properties (e.g., the properties determined to be within the search area).

At block 214, in an embodiment, the database may be queried to determine if detailed attribute information is available for the retrieved one or more property listing entries. For example, it may be determined that some of the property listing entries only have partial attribute information. In various embodiments, some of the attributes of a property listing entry may have partial attribute information while others have detailed attribute information. For the property listing entries that do not have detailed attribute information stored in the database, at block 216, the detailed attribute information may be downloaded from a listing server and the property listing entries may be updated.

At block 218, representations of the one or more property listing entries are displayed on the display device in the form of a map. In various embodiments, the one or more property listing entries are displayed in a list or table format. The property searching application may present various starting user interfaces. For example, the sequence just described is one where the user is presented with a map of property listings currently in his or her area. However, in a different embodiment, the application may launch with a search interface that a user can enter property attributes that are of interest (square footage, price range, bedrooms, etc.) and matching results are filtered before being displayed on a map.

In various embodiments, a user may select, using an input interface, one of the representations of property listings displayed on the map and request additional information (e.g., pictures or open house information). The additional information may be information already stored on the mobile electronic device or information that is on an external server (e.g., a listing server) that is retrieved via a request.

In various embodiments, the property listing application may have an augmented reality (AR) user interface for viewing representations of the property listings. The AR user interface may also be used as a standalone application that dynamically retrieves property listings in the vicinity (e.g., within 1 mile) of the MED as discussed further herein. The AR user interface may also be an alternate view within another property searching application than what is described in this disclosure. Thus, for example, the AR interface may be used for viewing properties with GPS coordinates. For discussion purposes, the AR user interface may be referred to as an AR property searching application.

Figure 6:
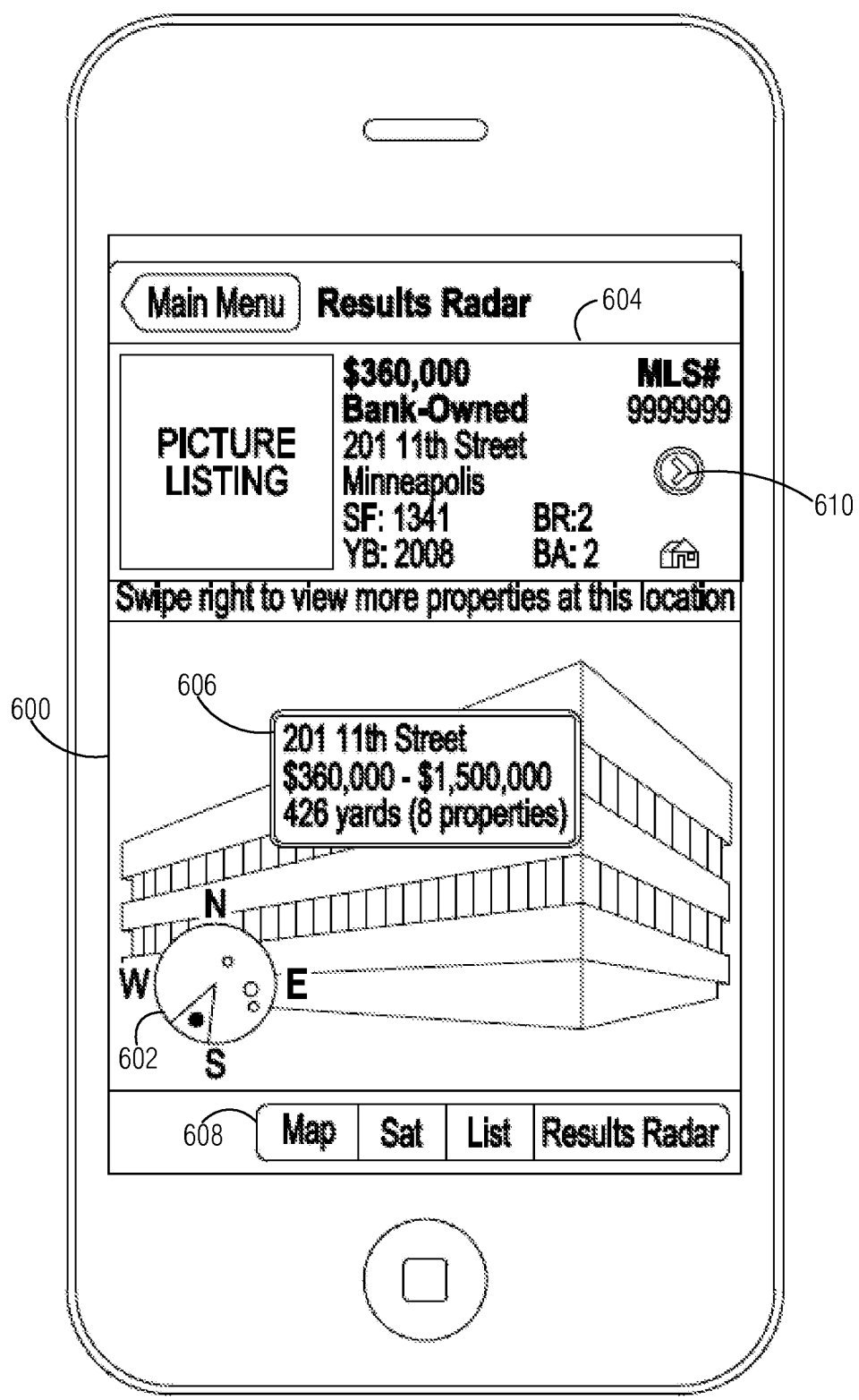
FIGS. 6-8 are example augmented reality view interfaces, according to various embodiments.
Figure 7:
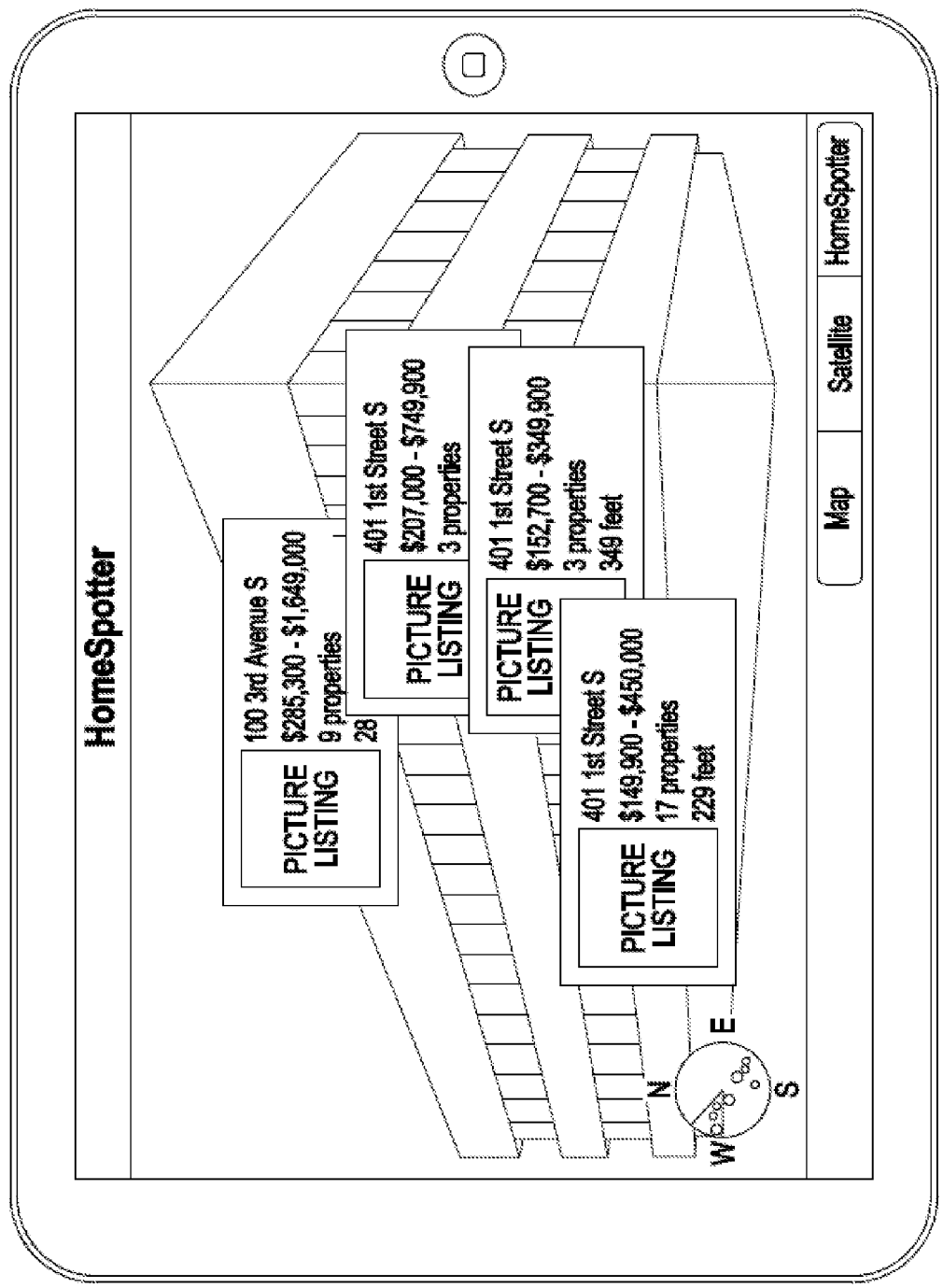
Figure 8:
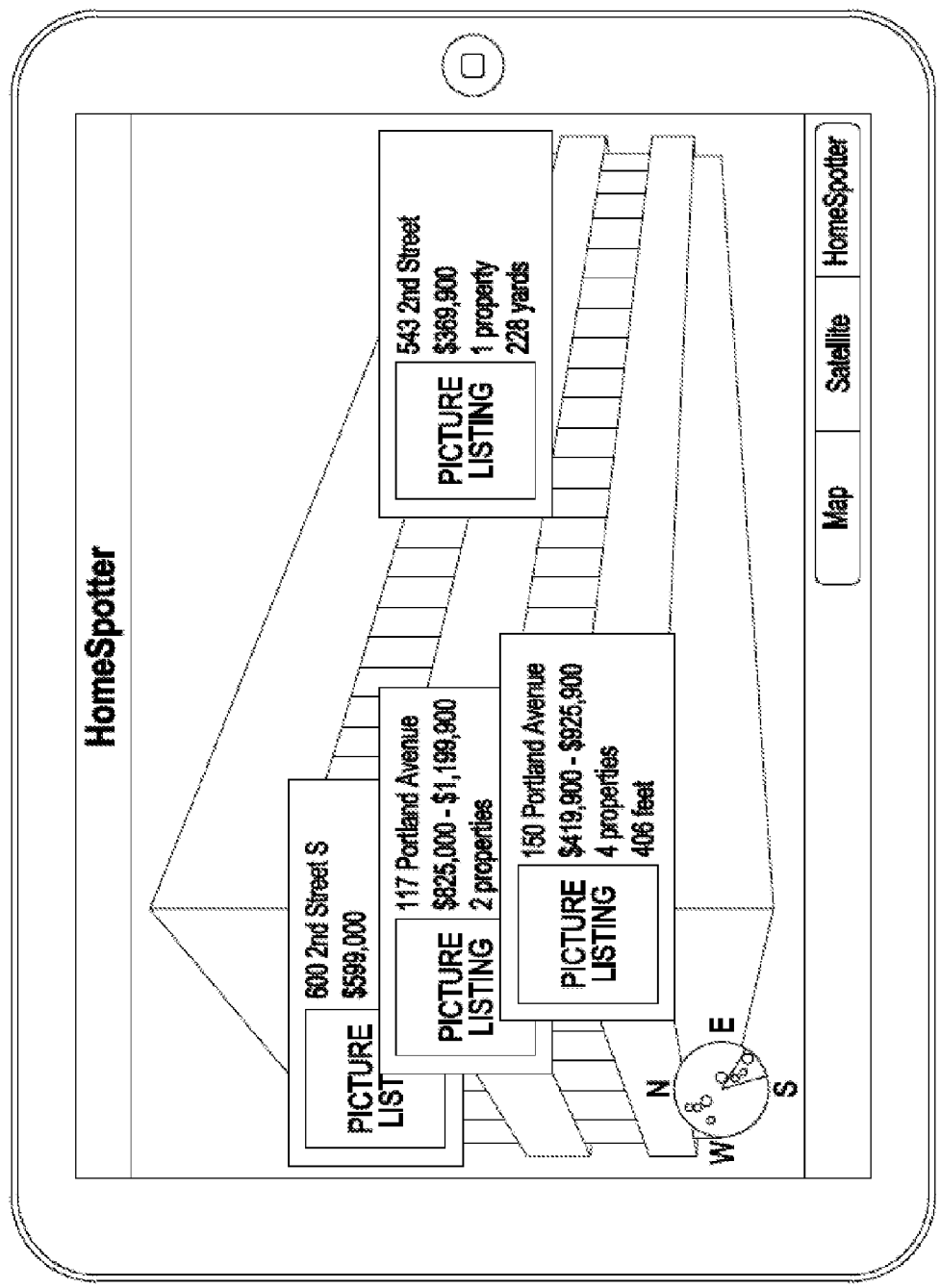
Figure 10:
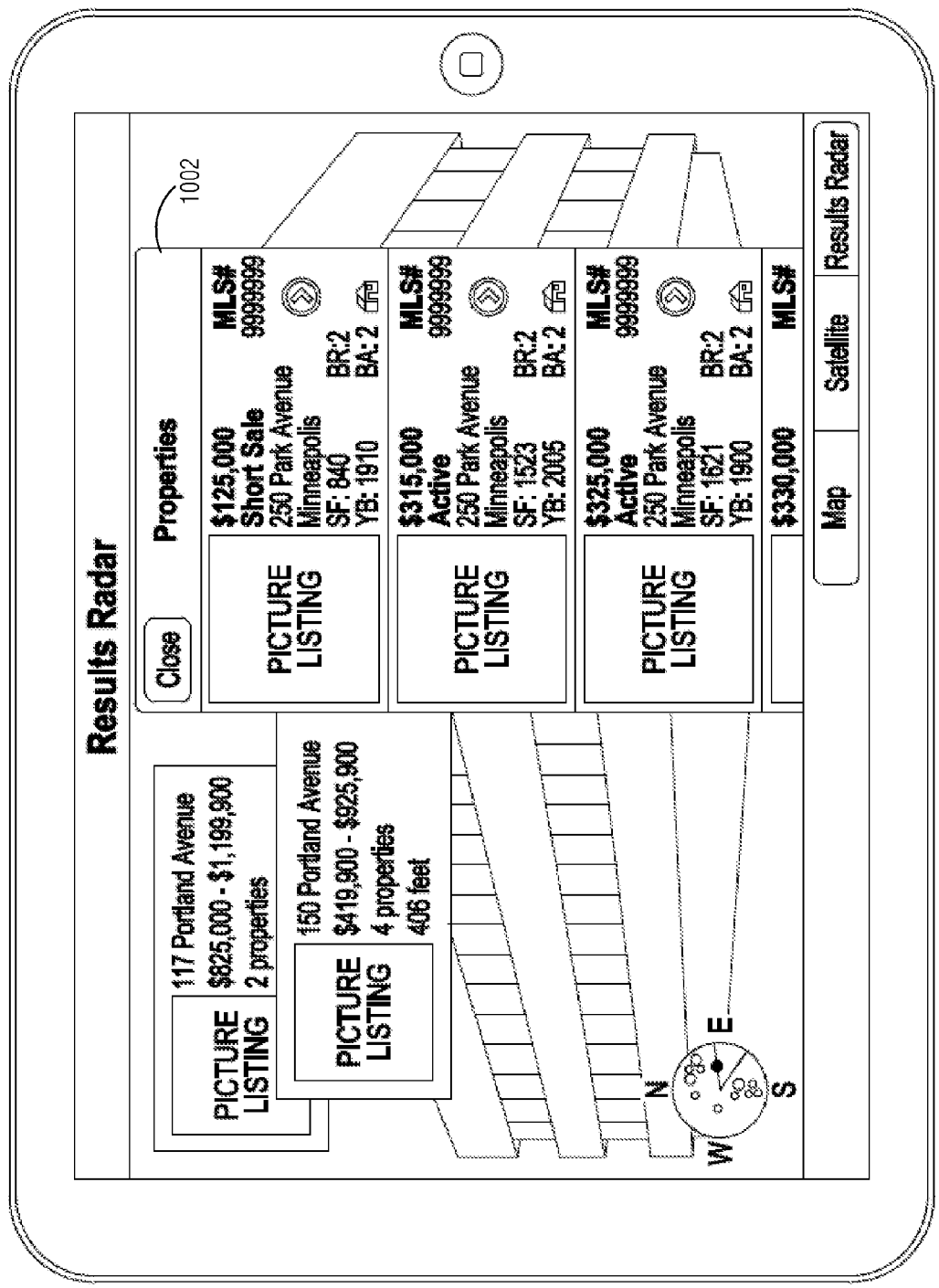
FIG. 10 is an example augmented reality view interface, according to various embodiments.

In various embodiments, FIG. 6 illustrate the AR user interface of a smart phone MED and FIGS. 7-8 and 10 illustrate the AR interface of a tablet MED. The interfaces may be different due to the size differences of the MED. For example, more UI elements such as property listing indicia may be able to be shown on a tablet display (e.g., a screen size of seven to ten inches) than a smart phone display (e.g., a screen size of three inches to five inches). However, in various embodiments the tablet interface may be displayed on a smart phone and vice versa.

In various embodiments, a user may launch the AR property searching application by selecting a representation (e.g., icon) of the application on the MED. In response to receiving the selection and launching the AR property searching application, a camera of the MED may be turned on. Then, the display screen of the MED may show a live view of what the camera is pointed towards.

In various embodiments, a UI of a virtual radar screen is overlaid on the live view to show various property listings within a determined radius of the MED location (e.g., within one mile of the GPS coordinates of the MED). In an embodiment, the location of the MED is determined using one or more of the following: receiving the location by invoking a location API call of the MED; accessing sensor data (e.g., GPS) of the MED; or manual entry of location information by a user. If a manual entry method is used, a map may be presented to the user in which the user may select his or her location. Other methods to determine to the MED may be used without departing from the scope of this disclosure.

While discussed herein with respect to property listings (e.g., those for sale or recently sold), the AR interface may also be used for displaying general property information (e.g., date built, square footage) retrieved from local or remote storage for properties that do not have an MLS number.

In various embodiments, the radar screen includes indicia indicating the relevant orientation of the MED. For example, the center of the radar as shown in FIGS. 6-8 may represent the location of the MED and a cone may be formed indicating the direction the MED is facing with respect to a defined part of the MED. For example, if the MED is a phone. the direction may be based on the back of the MED assuming the MED is being held vertically or the defined part may be the top of the phone if the phone is being held horizontally. The direction of the MED may be determined by querying, directly or indirectly, sensor data of the MED (e.g., accelerometer, GPS, compass). As shown, the radar includes directional cues (e.g., N, E, S, W). Thus, when the user turns the MED direction the cone may move according to the new direction of the MED. For example, FIG. 7 illustrates a radar with the MED facing generally west and FIG. 8 illustrates a radar with the MED facing generally south-east.

In an embodiment, the property listings within the determined radius are represented by a marker (e.g., circle) in the radar screen and are positioned on the screen to show distance and direction relative to the MED. The markers themselves may represent one or more property listings. For example, a single marker may represent multiple listings at a single location or closely located listings, such as multiple listings in an apartment complex.

In an embodiment, the size of the marker may scale relative to the number of listings represented by that marker. The size of the marker may be determined by an absolute (e.g., five listing are represented by a 10-pixel circle) or dynamically according to the type and/or density of property listings within the determined radius. Furthermore, different styles or colors of markers may be used to indicate multiple listings or the relative number of listings within a location without departing from the scope of this disclosure.

The location of the markers from the center of the radar may be relative/dynamic or absolute according to the determined radius. For example, using an absolute measurement, if the determined radius is one mile from the MED, a marker for a property listing one-half mile away may be placed half-way from the center of the radar to an edge. Alternatively, if a dynamic/relative method is used, markers within the third closest to the center may be within 500 feet of the MED, markers within the next third may be from 500 feet to 1500 feet, and the farthest third may be from 1500 feet to a mile. Thus, the radar screen overlay may allow for a quick view to see how many, where, and how far listings are located in relation to the orientation of the MED.

In an embodiment, the determined radius in the AR application may be set by a user, by the AR application, or a combination thereof. The radius may be set as a distance or dynamically determined according to a number of property listings markers to display in the radar. For example, an input control may be presented to the user on the display device of the MED to receive an input of a distance (e.g., 500 ft., 1 mile, etc.) from the MED to use as the radius or to receive a number (e.g., 25) of property listings to display. In various embodiments, the AR application has a default radius (e.g., a radius with 25 property listing markers). Because each marker may represent more than one property listing, the number of property listing entries may be more than the nominal number received from the user.

In various embodiments, the density of property listings is used to set the radius. For example, if there are between ten to twenty properties per square mile, a radius of one mile may be used whereas if the density is two properties per mile a radius of five miles may be used. A table may be stored on the MED correlating radius and density. The table may be accessed using the density as an input to determine the radius.

The AR application may adjust the distance represented by the radar according to the received input. For example, in the case of a radius determined by a number of a listings, the AR application may query a property listing database and retrieve the user entered number of property listings. Then the AR application may calculate the distance between the farthest property listing with respect to the MED device and use that determined distance as the radius. Thus, as a user walks around in with the MED the radius of search area represented by the radar, and therefore the number of markers displayed, may change.

FIG. 6 illustrates an AR interface, according to various embodiments. Interface 600 may include virtual radar 602, details bar 604, property stack 606, view options 608, and additional information control 610. In an embodiment, virtual radar 602 is a radar as described above. Additionally, one of the markers in virtual radar 602 may be highlighted (e.g., change color or size) based on the property listing shown in details bar 604. In an embodiment, view options include options to view property listings on a map view, satellite view, listing viewing, or augmented reality view (represented by results radar in FIG. 6). In various embodiments, the properties displayed in the various views may be filtered according to preferences of the user (e.g., square footage, price, etc.). In an embodiment, the transparency of virtual radar 602, details bar 604, and property stack 606 may be set according to a user preference.

In various embodiments, details bar 604—also referred to as a details interface—includes more details about an individual property listing in an overlay display bar. The details may include photo(s) and/or attribute data about the property. The details may be stored locally, remotely, or both. Additionally, while details bar 604 illustrates a single picture of a property, variations of a details bar may include multiple pictures or controls to view additional pictures. Furthermore, in various embodiments, details bar 604 includes an input control (e.g., additional information control 610), which when activated, retrieves further details about the property (e.g., square footage of individual rooms, amenities, etc.). The additional information may be shown as an overlay on the AR interface or as a separate interface.

The information in details bar 604 may relate to a selected property stack displayed in interface 600. Selecting may include receiving an input (e.g., touch) of the user within the property stack. A property stack—also referred to as a property listing group—may include one property or multiple properties. For example, multiple properties that are radially close (e.g., within X number of feet or share a common street address) may be shown as a single stack overlaid on the live view of the AR application. Property stack 606 may display a summary of the properties in the stack. For example, the summary may include a price range, address, distance to the nearest property, and the number of properties. FIGS. 7 and 8 illustrate multiple property stacks overlaid on the live view with no property stack selected, according to various embodiments.

The number of stacks overlaid in the live view and the number of properties in a given stack may be related to the size of the display screen or set as a user preference. For example, in a smaller screen, such as that of a smart phone, there may be a lower number of allowed property stacks displayed in the live view than compared to a larger screen such as that of a tablet. If the number of properties within the radar radius would result in a number of stacks greater than the allowed number, the radius may be reduced. In various embodiments, properties are stacked only if they share a common address or complex (e.g., an apartment building).

In various embodiments, to determine the location of where a property stack is overlaid on the live view, a comparison may be made between the GPS coordinates of the closest property in the stack and the GPS bounds of where the camera is facing. For example, the AR application may determine the GPS coordinates bounding the live view through a combination of the MED's location, orientation, magnetometer sensor data, gyroscope sensor data, and determined radius. Then, the property stack may be placed within the live view relative to these determined coordinates.

In an embodiment, the order of properties represented by the stack may be set according to distance from the MED. For example, the closest property to the MED may be initially placed at the "top" of the stack and displayed to a user in the details bar when the stack is "activated" by a user pressing/clicking on the stack. The order may also be set according to other criteria such as price, address number, square footage, etc. The order may be set according to a default and may be changed by a user.

In an embodiment, the user can interact with the detail bar to bring properties to the front of the stack to view. For example, a swipe gesture (e.g., touching the right-hand side of the screen and moving left, or vice-versa) may be used on the details bar. In an embodiment, swiping will advance or go-back through the different properties represented by the property stack according to the previously set order. In various embodiments, once the last property of a property stack is shown in the details bar, a subsequent swipe may bring up the front property of the next closest property stack. Other gestures or inputs may be used to advance through the stack without departing from the scope of this disclosure. For example, a user may click an arrow icon or click the right-hand side of the details bar.

In an embodiment, swiping to a new property will highlight the associated property marker or node on the radar screen. This may allow for showing multiple properties that are represented by one marker. While a swipe gesture has been discussed, other user inputs may also be used to traverse a property stack including, but not limited to, voice, MED movement, and stylus.

FIG. 10 is an example augmented reality view interface, according to various embodiments. For example, the interface may be shown on a tablet screen. In the interface, instead of a single property listing in a details bar as shown in FIG. 6, there is a details list of multiple property listings (1002, also referred to a details interface). Thus, a details property listing interface may be presented that includes multiple properties from a property stack. The details property listing interface may be swiped down or up to traverse the properties in the selected property stack. In various embodiments, the details property listing interface may be movable such that a user may touch-and-drag the details list around the live view.

Figure 3:
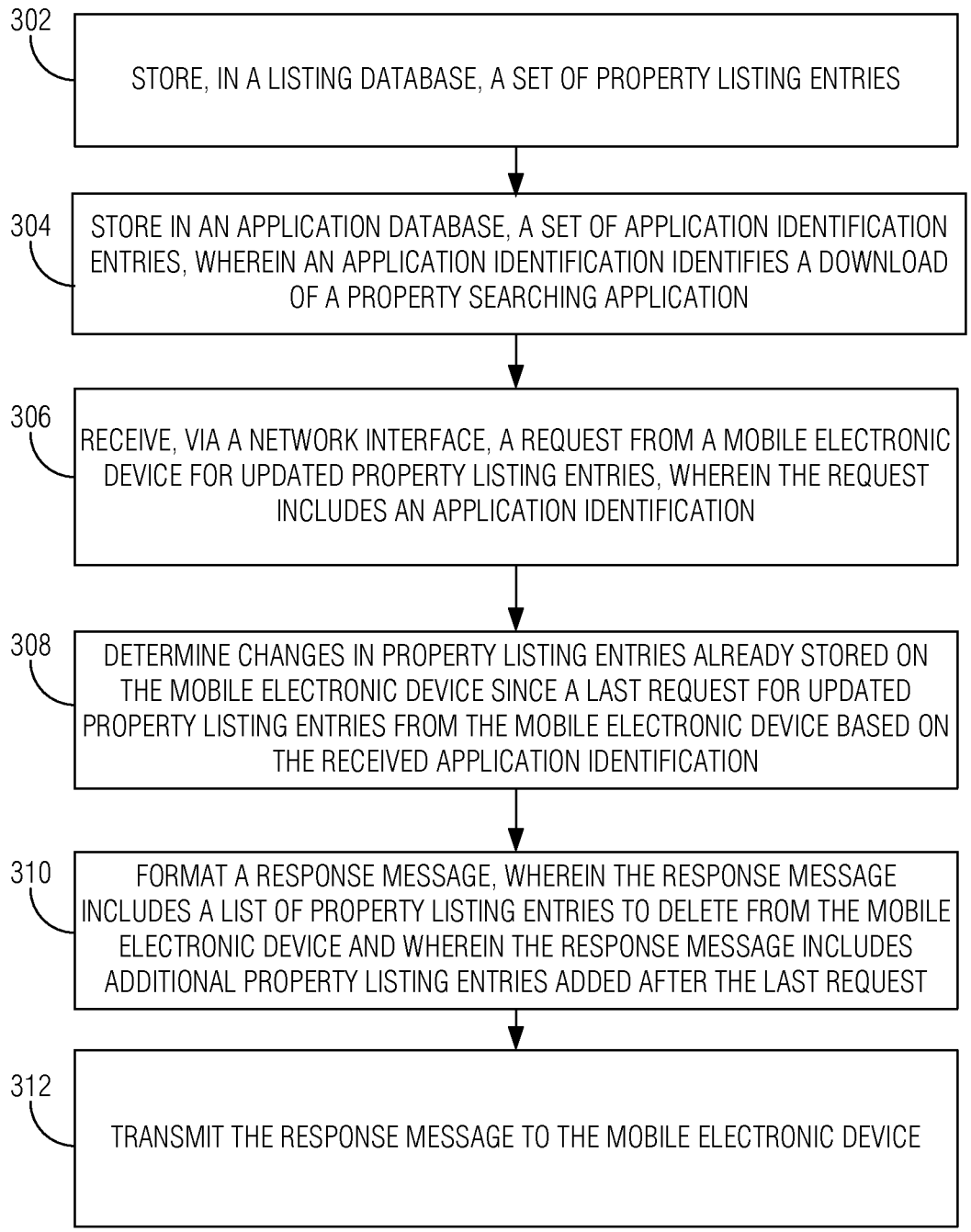
FIG. 3 is an example method of sending updated property listings, according to an example embodiment.

FIG. 3 is an example method of sending updated property listings, according to an example embodiment. At block 302, in an example embodiment, a set of property listing entries are stored in a listing database. The property listings may be periodically updated from a multiple listing services database.

In various embodiments, attributes of a property stored on the listing server may be a superset of the attributes of the property listing stored on a mobile electronic device. For example, the types of bathrooms may be stored on the listing server while only the total number of bathrooms is stored on the mobile electronic device. In another example embodiment, media associated with a property listing is maintained on the listing server and is available upon request (e.g., photos of a residential property). In yet another embodiment, the information stored on the mobile electronic device may be compressed and stored as partial attribute information. For example, price information may be stored as a range on the mobile electronic device (e.g., 25 k ranges, 100-125 k, 126-150 k, etc.). Similarly, addresses stored on the mobile electronic device may only include city and zip code. In other embodiments, a property listing entry on the listing server is identical to one stored on the mobile electronic device.

In an example embodiment, at block 304, a set of application identification entries are stored in an application database, wherein an application identification identifies a download of a listing database for a property searching application. At block 306, in an example embodiment, a request is received from a mobile electronic device for updated property listing entries, wherein the request includes an application identification. At block 308, in an example embodiment, changes in property listing entries already stored on the mobile electronic device since a last request for updated property listing entries from the mobile electronic device are determined based on the received application identification.

By having a unique identification of each application download a listing server can track indirectly which property listing entries are currently stored on the mobile electronic device. This may be done through the use of timestamps being associated with each request for updated property listing entries. A listing server may only need to look at changes to property listings after the last time-stamped entry. In an embodiment, a unique identification of each application is not needed. Instead, an application identification may be received from the mobile electronic device that indicates the last time the mobile electronic device updated its property listings. Thus, a compare may be done to determine what listings have changed after the timestamp.

In an example embodiment, at block 310, a response message is formatted, wherein the response message includes a list of property listing entries to delete from the mobile electronic device and wherein the response message includes additional property listing entries added after the last request. The response message may also include property listings to modify. The formatting may specify an identification of a property listing entry and an action to take. In an example embodiment, at block 312, the response message is transmitted to the mobile electronic device. In an embodiment, the response message may compress latitude and longitude of one or more property listing entries based on clusters of nearby property entries.

Figure 4:
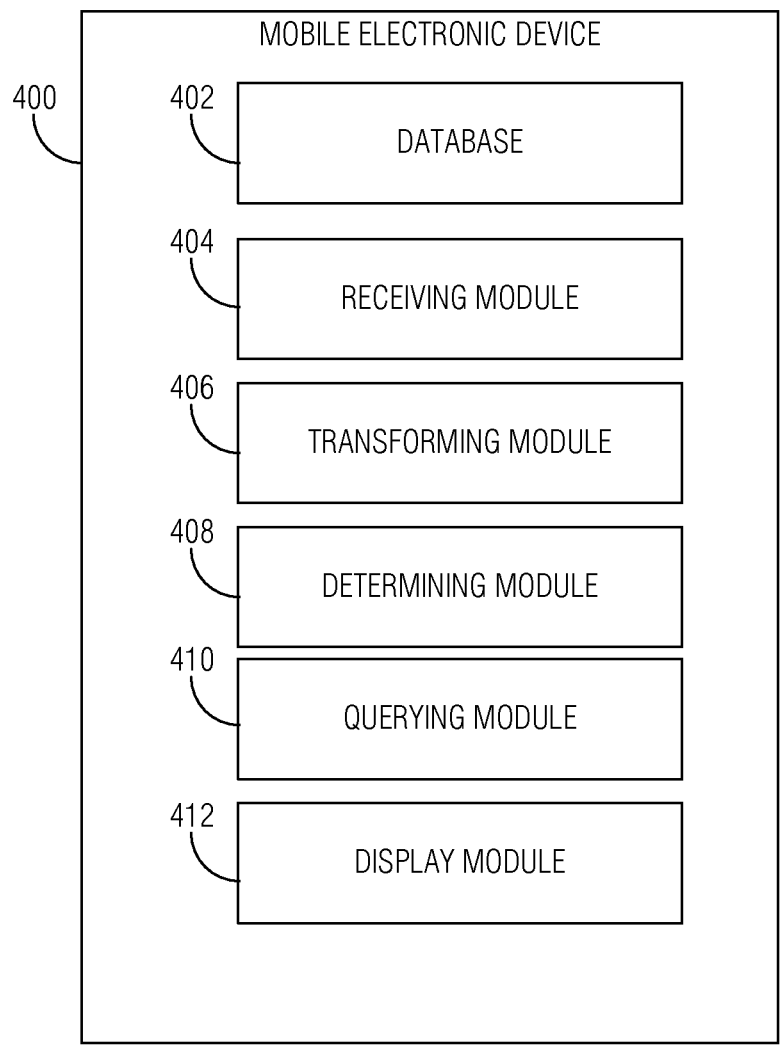
FIG. 4 is an example system diagram of a mobile electronic device.

FIG. 4 is an example system diagram of a mobile electronic device. Shown is mobile electronic device 400 including database 402, receiving module 404, transforming module 406, determining module 408, querying module 410, and display module 412.

In an embodiment database 402 stores a set of property listing entries, wherein a property listing entry includes an identification data field and a location coordinate data field. In an embodiment, receiving module 404 is to receive from a listing server, via a network interface of the mobile electronic device, updated property listing entries. In an embodiment, transforming module 406 is to transform the set of property listing entries based on the updated property listings. In an embodiment, determination module 408 is to determine a search area. In an embodiment, querying module 410 is to query the database to retrieve one or more property listing entries from the set of property listing entries based on a comparison between the search area and the location coordinate data fields of the property listing entries. In an embodiment, display module 412 is to display, on a display device of the mobile electronic device, representations of the one or more property listing entries on a map.

Figure 9:
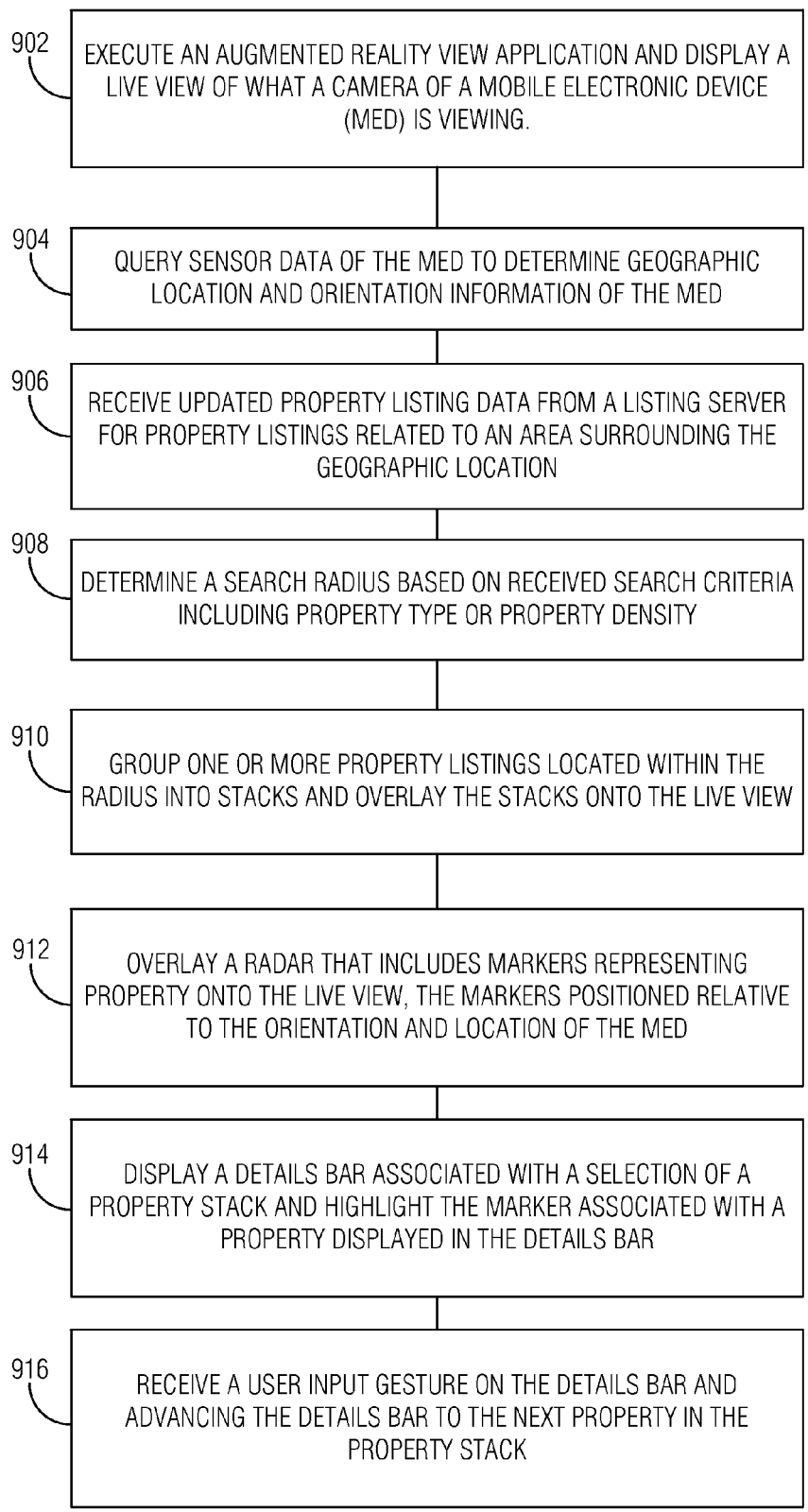
FIG. 9 is an example method of using an augmented reality view interface, according to various embodiments.

FIG. 9 illustrates a flowchart of a method for using an augmented reality interface, according to various embodiments.

At block 902, in an embodiment, an augmented reality (AR) view application is executed on a MED and a live view of what a camera of the MED is viewing is displayed on the display of the MED. The AR application may be part of a property searching application as discussed herein.

At block 904, in an embodiment, sensor data of the MED is queried to determine geographic location and orientation information of the MED. At block 906, in an embodiment, updated property listing data is received from a listing server for property listings related (e.g., within) to an area surrounding the geographic location. For example, the nearest 100 property listings or all properties within five miles may be received.

At block 908, in an embodiment, a search radius is determined based on received search criteria including property type of property density. For example, the radius may be set according to a user or dynamically set as discussed herein. The radius may be set relative to the location of the MED. The radius may also take into consideration user filters such as a price range, etc. For example, if the initial radius is determined to be one mile based on property density, but the user's preferences lower the density of relative results, the radius may be expanded.

At block 910, in an embodiment, one or more property listings located within the radius may be grouped into stacks. The stacks may be overlaid onto the live view of the camera. At block 912, in an embodiment, a radar that includes markers representing one or more properties may be overlaid on the live view. The markers may be positioned relative to the orientation and location of the MED.

At block 914, in an embodiment, a details bar associated with a selection of a property stack may be displayed. The marker associated with the property displayed in the details bar may be highlighted within the radar. Highlighting may include changing the color of the marker. At block 916, in an embodiment, a user input gesture may be received on the details bar and the then the next property in the property stack may be displayed in the details bar. In an embodiment, the user input gesture is a swiping gesture.

A Computer System

Figure 5:
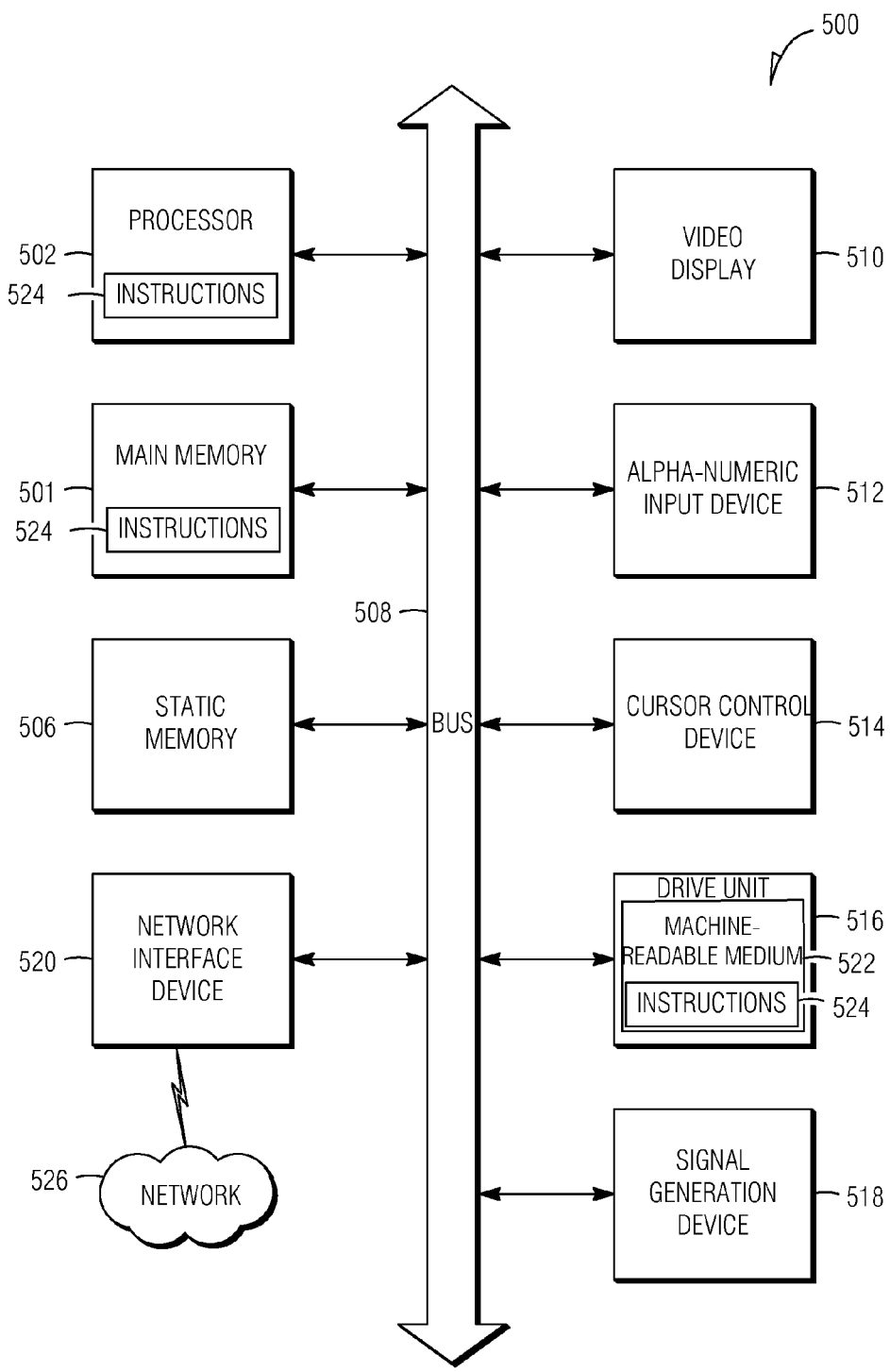
FIG. 5 illustrates a computer system, according to an example embodiment.

FIG. 5 shows a diagrammatic representation of a machine in the example form of a computer system 500 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which are linked (e.g., either by hardwired, wireless, or a combination of hardwired and wireless connections) through a network, both perform tasks. In a distributed system environment, program modules may be located in both local and remote memory-storage devices (see below).

The example computer system 500 includes a processor 502 (e.g., a Central Processing Unit (CPU), a Graphics Processing Unit (GPU) or both), a main memory 501 and a static memory 506, which communicate with each other via a bus 508. The computer system 500 may further include a video display unit 510 (e.g., a Liquid Crystal Display (LCD) or a Cathode Ray Tube (CRT)). The computer system 500 also includes an alphanumeric input device 512 (e.g., a keyboard), a User Interface (UI) cursor controller 514 (e.g., a mouse), a disk drive unit 516, a signal generation device 518 (e.g., a speaker) and a network interface device 520 (e.g., a transmitter).

The disk drive unit 516 includes a machine-readable medium 522 on which is stored one or more sets of instructions 524 and data structures (e.g., software) embodying or used by any one or more of the methodologies or functions illustrated herein. The software may also reside, completely or at least partially, within the main memory 501 and/or within the processor 502 during execution thereof by the computer system 500, the main memory 501 and the processor 502 also constituting machine-readable media.

The instructions 524 may further be transmitted or received over a network 526 via the network interface device 520 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

The various embodiments described herein may be implemented including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

It is to be understood that the above description is intended to be illustrative, and not restrictive. For example, the above-illustrated embodiments (and/or aspects thereof) may be used in combination with each other. Many other embodiments may be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim.

What is claimed is:

1. A method comprising:
    grouping a plurality of property listings into at least one property listing group, the plurality of property listings selected based on a search area associated with a location of a mobile device;
    displaying, on the mobile device, a first group of the at least one property listing group overlaid on a live view of a camera of the mobile device, the displayed location of the first group based on an orientation of the mobile device;
    displaying a details interface overlaid on the live view, the details interface including attribute data of a first property listing of the first group;
    receiving a user interaction with the details interface; and
    displaying attribute data from a second property listing of the first group based on the user interaction.

2. The method of claim 1, wherein grouping a plurality of property listings into the at least one property listing group comprises grouping property listings of the plurality of property listings with a common address.

3. The method of claim 1, further displaying the first group of the at least one property listing group comprises displaying a summary of property listings in the first group.

4. The method of claim 3, wherein the summary includes a price range of property listings in the first group.

5. The method of claim 1, further comprising:
    overlaying a radar on the live view, the radar including a marker representing the first group, the position of the marker in the radar positioned according to the orientation of the mobile device.

6. The method of claim 1, further comprising:
    displaying, on the mobile device, a second group of the at least one property listing group overlaid on the live view;
    receiving a selection of the second group; and
    updating the details interface to display attribute data of a first property listing of the second group.

7. The method of claim 6, further comprising:
    overlaying a radar on the live view, the radar including a first marker representing the first group and a second marker representing the second group, the positions of the first and second markers in the radar positioned according to the orientation of the mobile device; and
    highlighting the second marker based on receiving the selection of the second group.

8. The method of claim 7, wherein the size of the first marker is determined based on the number of properties in the first group.

9. A non-transitory computer-readable storage device comprising instructions stored thereon, which when executed by at least one processor cause the processor to perform operations comprising:
    grouping a plurality of property listings into at least one property listing group, the plurality of property listings selected based on a search area associated with a location of a mobile device;
    displaying, on the mobile device, a first group of the at least one property listing group overlaid on a live view of a camera of the mobile device, the displayed location of the first group based on an orientation of the mobile device;
    displaying a details interface overlaid on the live view, the details interface including attribute data of a first property listing of the first group;
    receiving a user interaction with the details interface; and
    displaying attribute data from a second property listing of the first group based on the user interaction.

10. The computer-readable storage device of claim 9, wherein grouping a plurality of property listings into the at least one property listing group comprises grouping property listings of the plurality of property listings with a common address.

11. The computer-readable storage device of claim 9, wherein the operations further comprise:
    displaying the first group of the at least one property listing group comprises displaying a summary of property listings in the first group.

12. The computer-readable storage device of claim 11, wherein the summary includes a price range of property listings in the first group.

13. The computer-readable storage device of claim 9, wherein the operations further comprise:

overlaying a radar on the live view, the radar including a marker representing the first group, the position of the marker in the radar positioned according to the orientation of the mobile device.

14. The computer-readable storage device of claim 9, wherein the operations further comprise:
displaying, on the mobile device, a second group of the at least one property listing group overlaid on the live view;
receiving a selection of the second group; and
updating the details interface to display attribute data of a first property listing of the second group.

15. The computer-readable storage device of claim 14, wherein the operations further comprise:
overlaying a radar on the live view, the radar including a first marker representing the first group and a second marker representing the second groups, the positions of the first and second markers in the radar positioned according to the orientation of the mobile device; and
highlighting the second marker based on receiving the selection of the second group.

16. A system comprising:
at least one processor;
at least one storage device comprising instructions stored thereon, which when executed by the at least one processor, cause the at least one processor to:
group a plurality of property listings into at least one property listing group, the plurality of property listings selected based on a search area associated with a location of a mobile device;
display, on the mobile device, a first group of the at least one property listing group overlaid on a live view of a camera of the mobile device, the displayed location of the first group based on an orientation of the mobile device;
display a details interface overlaid on the live view, the details interface including attribute data of a first property listing of the first group;
receive a user interaction with the details interface; and
display attribute data from a second property listing of the first group based on the user interaction.

17. The system of claim 16, wherein the details interface includes attribute data from multiple property listings of the first group.

18. The system of claim 16, wherein the details interface includes an input control configured to retrieve further attribute information associated with the first property listing.

19. The system of claim 16, wherein the instructions, when executed by the at least one processor, configure the at least one processor to display a radar overlaid on the live view, the radar including a first marker representing the first group and a second marker representing a second group of the at least one property listing group.

20. The system of claim 19, wherein the size of the first marker is associated with the number of property listings in the first group.

21. The system of claim 16, wherein the attribute data includes a price.

* * * * *